United States Patent [19]
Tomita et al.

[11] Patent Number: 5,954,795
[45] Date of Patent: Sep. 21, 1999

[54] METHOD OF AND APPARATUS FOR REDUCING SERVER AND NETWORK LOAD WITH CLIENT-SIDE DATA STRUCTURE

[75] Inventors: Hisashi Tomita; Taku Tanaka, both of Tokyo; Kaoru Nishimura, Kanagawa, all of Japan

[73] Assignee: Sony Corporation, Tokyo, Japan

[21] Appl. No.: 08/711,407

[22] Filed: Sep. 5, 1996

[30] Foreign Application Priority Data

Sep. 14, 1995 [JP] Japan .................................. 7-262294
Aug. 15, 1996 [JP] Japan .................................. 8-233638

[51] Int. Cl.⁶ .......................... G06F 13/38; G06F 15/17
[52] U.S. Cl. .......................................... 709/218; 707/10
[58] Field of Search ....................... 395/200.33, 200.46, 395/200.49, 200.34, 200.47, 200.65, 200.61; 707/10, 1; 709/203, 216, 219, 214, 217, 235, 231

[56] References Cited

U.S. PATENT DOCUMENTS 4,887,204  12/1989  Johnson et al. ........................... 707/10
5,367,698  11/1994  Webber et al. ...................... 395/200.33
5,408,608   4/1995  Ryu et al. .................................. 707/10
5,634,052   5/1997  Morris ................................. 395/200.49

FOREIGN PATENT DOCUMENTS 2041642  3/1991  Canada ........................... G06F 12/00
9104532  4/1991  WIPO ............................. G06F 12/00

OTHER PUBLICATIONS

Brown et al., "Netscape 2.0"; Que Corporation, pp. 164–165, 192–194 and 308–310, 1995.

*Primary Examiner*—Mark H. Rinehart
*Attorney, Agent, or Firm*—Limbach & Limbach, LLP

[57] ABSTRACT

An information apparatus is disclosed in which a network can be used less frequently so as to reduce the load to the network. The apparatus has a storage device for storing a plurality of information items and mutually-related information concerning the information items. An information-item determination device determines one of the information items in response to the user based on the related information. The determined information item indicates a specific information item stored in an information storage system connected to the terminal by way of communications.

13 Claims, 4 Drawing Sheets

METHOD OF AND APPARATUS FOR REDUCING SERVER AND NETWORK LOAD WITH CLIENT-SIDE DATA STRUCTURE

BACKGROUND OF THE INVENTION

1. Field of the Invention

The present invention relates to a terminal located on a network in which an improvement can be made in the communication efficiency of the network interconnected to a plurality of computers performing processing, such as information retrieval. The invention also relates to an information recording medium readable in the above type of terminal.

2. Description of the Related Art

As an increasing development of a computer network, a plurality of computers can be interconnected to a network shared by the users, and accordingly, it becomes possible to gain easy access to the information stored in the interconnected computers from a specific terminal. Various types of information are stored in the computers located on the network depending on the purposes and uses, and the user is able to access a targeted item of information according to a user interface in the form of a hierarchical tree structure which has been stored in the computer, so that the information can be retrieved.

Figure 4:
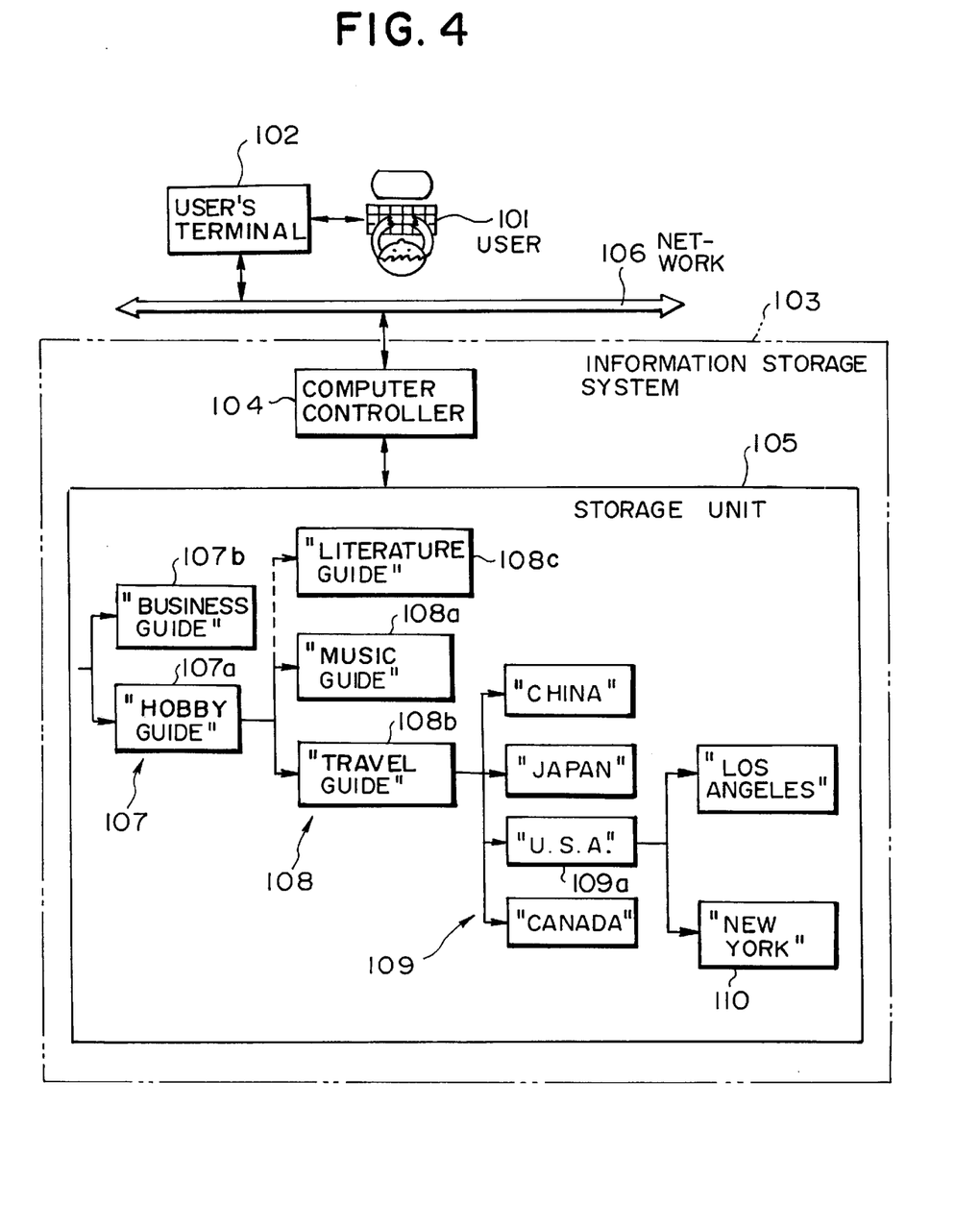
FIG. 4 illustrates an example of conventional information apparatuses.

An explanation will now be given with reference to FIG. 4 of an example of known information storage systems using a hierarchical tree-structured interface.

(1) Construction

In this example of a known art, an information storage system 103 is used to provide information concerning hobbies and business. A user 101 operates his/her terminal 102. This terminal 102 is connected to communication means 106, which is generally referred to as "a network". The network 106 achieves information communications between a plurality of computers interconnected onto the network 106 according to a specific procedure as if the computers are directly connected to each other.

The information storage system 103 is connected to the same network 106, and thus, the terminal 102 serves as a terminal of the system 103. Namely, the user 101 is able to operate the system 103 through the terminal 102. The storage system 103 is constructed of a computer controller 104 and a storage unit 105.

The storage unit 105 can store various types of information, and in this example, finally stores information about travelling, such as local maps, entertainments, hotels, etc. (hereinafter referred to as "the final information"). The contents of the storage unit 105 include not only the final information but also the attribute of the information as key information. For example, the key information 107, 108 and 109 effectively used for gaining access to the travel information, such as "New York", includes "hobby guide" 107a, "travel guide" 108b, "U.S.A." 109a, etc., respectively.

The computer controller 104 functions to (1) logically connect the storage unit 105 to the network 106, and (2) fetch the final information (the latest information 110 about, for example, "New York") or the key information 107, 108 and 109 so as to send the fetched information to the terminal 102.

(2) Operation

The operation of the storage system 103 constructed as described above will now be described in the case where the user would like to obtain the final information 110 concerning "New York" by way of example.

When the user specifies the information storage system 103, the user's terminal 102 can designate the system 103 through the network 106. Accordingly, the terminal 102 is apparently connected to the information storage system 103 on a one-for-one basis. In practice, however, the storage system 103 merely allocates the processing time to the individual users in a time-sharing manner to enable a plurality of users' terminals to access the system 103 at the same time.

Then, for guiding the information to be retrieved, the computer controller 104 of the storage system 103 fetches the items of the key information 107 located in a first level of the hierarchical tree structure stored in the storage unit 105 and outputs the information to the user's terminal 102 that the items "business guide" 107b and "hobby guide" 107a are available as the key information 107.

The terminal 102 receives the above information sent from the computer controller 104 and displays it on the terminal 102. The user 101 who would like to obtain the final information "New York" selects and specifies the "hobby guide" 107a from the key information. This is transmitted to the computer controller 104 via the terminal 102 and the network 106. Subsequently, the controller 104 fetches the items of the key information 108 positioned in a second level of the hierarchical tree structure stored in the storage unit 105 and sends the information to the user's terminal 102 that the items "music guide" 108a, "travel guide" 108b and "literature guide" 108c are available as the key information 108.

In a manner similar to the procedure described above, the user 101 selects the item "travel guide" 108b so as to cause the computer controller 104 to send the information to the terminal 102 that information about countries as travelling destinations, such as "China", "Japan", etc., are available as the key information 108 located in a third level of the tree structure stored in the storage unit 105. The user 101 is thus able to finally access the final information 110 "New York".

However, the information storage system of the above known type encounters the following problems in order to let the user 101 to access the final information by operating the terminal 102.

(1) It is necessary to thoroughly search the tree structure in the information storage system 103. More specifically, the computer used as the information storage system 103 is required to monitor, according to the related information in the form of the key information 107 through 109, in which level of the tree structure the user 101 currently connected to the system 103 refers to and which information item the user 101 has selected, thereby disadvantageously consuming computation resources.

(2) In order to display the key information 107 through 109 onto the terminal 102, the information storage system 103 is required to send onto the network 106 the key information 107 through 109 halfway through the searching of the tree structure in the storage system 103. This operation consumes network resources.

(3) Further, the tree structure of the storage unit 105 is variable, since it is constantly managed by the operator assigned to each information storage system 103. More specifically, in the aforesaid example, the item "literature guide" 108c is newly added to the items "music guide" 108a and "travel guide" 108b branched from the hobby guide 107a of the key information 108. The user 101 who is not skilled in this type of operation may be confused by this change of displaying the guide.

SUMMARY OF THE INVENTION

Accordingly, it is an object of the present invention to provide a terminal located on a network, free from the problems inherent in the known art, in which the network can be used less frequently so that a network load can be decreased, and also, the user is able to readily obtain desired information items, and further to provide an information recording medium readable in the above type of terminal.

In order to achieve the above object, according to one aspect of the present invention, there is provided a terminal located on a network, for transferring information desired by a user from an information storage system via a communication line, the terminal comprising: storage means for storing a plurality of information items and mutually-related information concerning the information items; and information-item determination means for determining, based on the related information, one of the plurality of information items in response to the user, wherein the information related to the information item determined by the information-item determination means is extracted from the information storage system via the communication line.

With this arrangement, processing can be executed on the user's terminal until the final information is selected, and thereafter, the terminal can extract a desired information item from the information storage system. The network can thus be used less frequently so as to reduce the load to the network.

Hence, the terminal of the present invention has storage means for storing a plurality of information items and mutually-related information concerning the information items, and information-item determination means for determining one of a plurality of information items. The user selects the information item, based on the related information, according to the information-item determination means. The information item specified herein indicates specific information stored in an information storage system connected to the terminal by means of communications. A plurality of information items are operated to determine a specific information item stored in an information storage system connected to the terminal by means of communications.

The mutually-related information is stored in the form of a hierarchical tree structure by levels in a related manner, serving as "key information" for finally obtaining a targeted information item by the user, so as to provide the key information to the user. Further, the information-item determination means for determining, based on the related information, one of the information items in response to the user searches the levels of the tree structure while presenting the key information to the user so as to finally cause the user to select one of the information items.

According to another aspect of the present invention, there is provided an information storage medium readable in a terminal located on a network for transferring information desired by a user from an information storage system via a communication line, the information storage medium comprising: a plurality of information items; mutually-related information concerning the information items; information-item determining control information for causing the terminal to determine, based on the related information, one of the plurality of information items demanded by the user for the terminal; and information-item extracting control information for extracting the information item determined by the information-item determining control information from the information storage system via the communication line.

In this invention, the above type of information storage medium is portable by the user.

DESCRIPTION OF THE PREFERRED EMBODIMENTS

A detailed description will now be given of preferred embodiments of the present invention with reference to the accompanying drawings. The present invention will be explained below in its preferred forms, and suitable technical limitations are thus imposed on the embodiments. However, it is to be understood that the invention is not limited to the specific forms of the embodiments thereof unless otherwise specified in the following description.

Preferred embodiments of the present invention will now be described with reference to FIGS. 1 through 3.

First Embodiment (1) Construction

Figure 1:
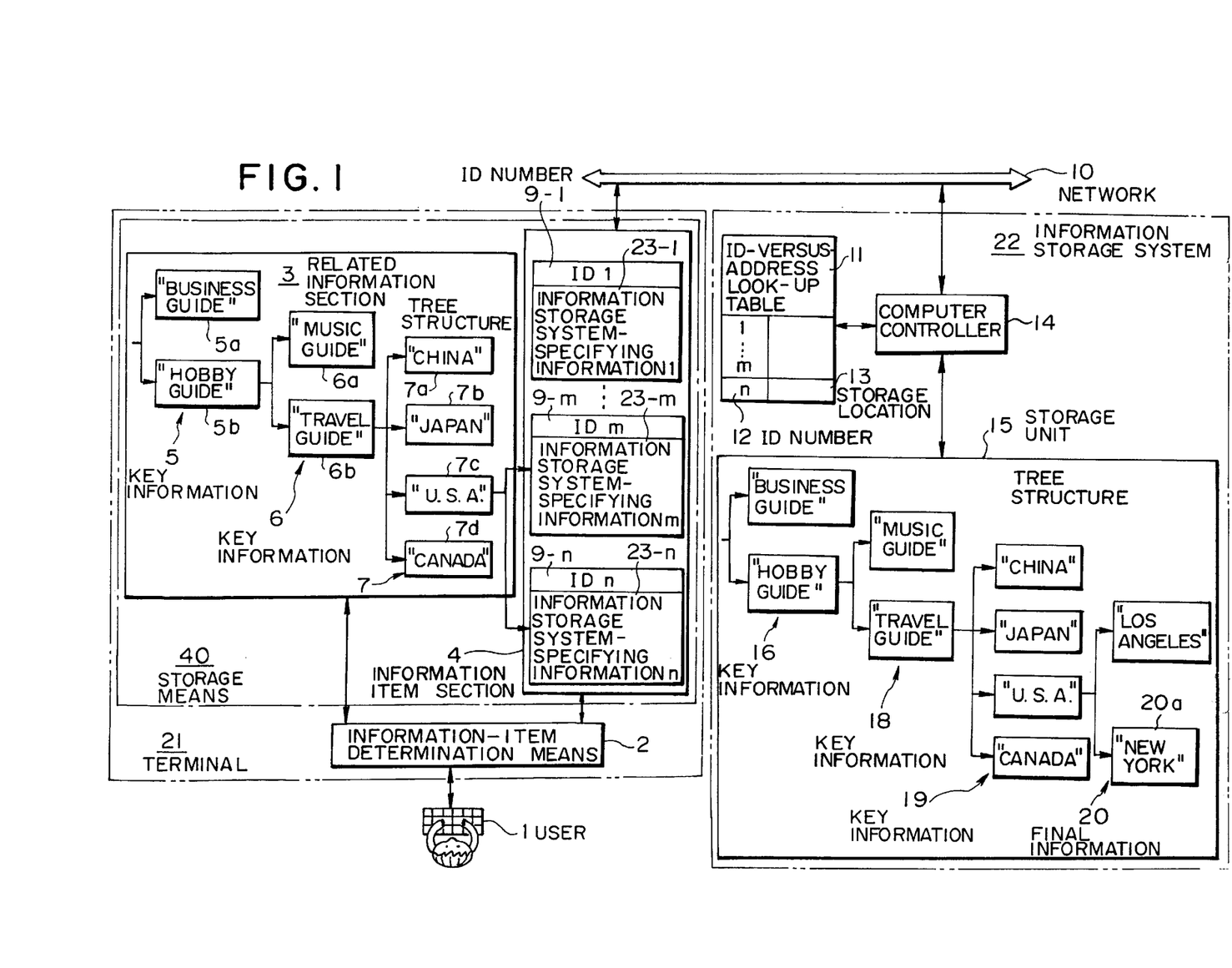
FIG. 1 a schematic diagram illustrating a first preferred embodiment of an information apparatus provided with a terminal of the present invention.

FIG. 1 is a schematic diagram of a first embodiment of the present invention. A terminal 21, serving to link a user 1 and a network 10, executes processing specified by the user 1 and transmits required information to a specific information storage system 22 on the network 10. The terminal 21 comprises information-item determination means 2, a related information section 3 and an information item section 4. The related information section 3 and the information item section 4 are contained in storage means 40.

The related information section 3, part of the storage means 40, stores "key information" 5 through 7, which is effectively used to enable the user 1 to access a targeted item of information, in the form of a hierarchical tree structure by levels in a corresponding manner, and is thus able to provide the information to the user. Referring to FIG. 1, the related information section 3 is constructed of three levels, "key information" 5 through 7, the levels being classified according to a predetermined meaning. The "key information" 5 through 7 corresponds to the related information used for the below-described information items.

The information item section 4, part of the storage means 40, stores the ID numbers of a plurality of predetermined information items (9-1, . . . , 9-m, 9-n) corresponding to the "key information" 7 located at the bottom level of the hierarchical structure stored in the related information section 3. The information item section 4 also stores information storage system-specifying information (23-1, . . . , 23-m, 23-n), which comprises a plurality of information items each indicating in which information storage system connected to the network 10 the targeted information item is stored.

The storage means 40 for storing the information of the related information section 3 and the information item section 4 may include information transfer members, such as floppy disks, memory cards, magneto-optical disks, optical disks, digital tape, all of which are information storage mediums attachable from the exterior of the terminal 21. The contents stored in the information transfer members can be copied onto a storage member, such as a hard disk, a semiconductor memory, or the like, integrated into the computer. This copying operation is performed so that the information updated through the below-described communication line can be loaded, and the computer can be started from a second time by referring to the data stored in the storage member without requiring the external information transfer member.

The storage means 40 shown in FIG. 1 using an information storage medium, such as a floppy disk, by way of example, is constructed as follows. More specifically, the information storage medium is readable on the terminal located on the network 10 used as a communication line, so that the information desired by the user 1 can be transferred from the information storage system 22 through the network 10. The information storage medium stores ID numbers (ID1 through IDn), which are a plurality of information items, and key information 5, 6 and 7, which is the related information corresponding to the ID numbers. The storage medium includes control information for determining an information item (control information stored in the information-item determination means 2) used for causing the terminal 21 to determine, based on the related information items, one item from the above-described plurality of information items. The storage medium also has information storage system-specifying information 23-1 through 23-n serving as control information for fetching from the information storage system 22 through the communication line the information item determined by the aforesaid control information for determining an information item.

The information-item determination means 2 links the related information section 3 and the user 1, so that the means 2 can search each level in the hierarchical tree structure stored in the related information section 3 under an instruction from the user 1, while presenting the "key information" 5 through 7 to the user 1. Upon reaching the final level located at the bottom of the hierarchical structure, the determination means 2 extracts, based on the "key information" 5 through 7 of the related information section 3 stored in the storage means 40, the ID number corresponding to the targeted information item, which is an information item stored in the information item section 4, under an instruction from the user (operator) 1.

The information storage system 22 will now be explained. The information storage system 22 has a computer controller 14, a storage unit 15 and an ID-versus-address look-up table 11.

The storage unit 15 stores various types of final information concerning travelling, for example, local maps, entertainments, hotels, in the form of a hierarchical tree structure. The contents of the information include not only the "final information" 20 but also its "attribute" as the "key information" 16, 18 and 19.

The ID-versus-address look-up table 11 stores predetermined ID numbers 12 for the information provided by the final information 20 and also stores storage locations (addresses) 13 of the final information 20. In this look-up table 11, the final information items 20 are related to the ID numbers 12 on a one-for-one basis, i.e., each item of final information 20 has the unique ID number 12. The ID numbers 12 specified herein mean identification numbers which have been determined corresponding to the individual final information items 20.

The computer controller 14 logically connects the storage unit 15 to the network 10 and further extracts, under an instruction from the user 1 through the terminal 21, the final information 20 or the "key information" 16, 18 and 19 stored in the storage unit 15 so as to send it to the terminal 21. If the ID number is instructed from the terminal 21 connected to the network 10, the computer controller 14 retrieves the same ID number in the ID-versus-address look-up table 11 and extracts the associated storage location 13 (address), thereby sending the final information 20 to the terminal 21 in accordance with the address.

Namely, the storage means 40 further stores the information storage system-specifying information 23-1 through 23-n indicating in which storage system 22 connected to the network 10 the targeted information item determined by the information-item determination means 2 is stored. The determination means 2 can thus acquire the final information 20 from the look-up table 11 through the information storage system specifying information 23-1 through 23-n.

(2) Operation

An explanation will now be given of the operation of the first embodiment when the user 1 would like to obtain the final information 20a "New York" shown in FIG. 1 by way of example. For guiding the item "New York" 20a of the final information 20 to be retrieved, the information-item determination means 2 of the terminal 21 shown in FIG. 1 first extracts the "key information" 5 located in the first level of the tree structure of the related information section 3 stored in the storage means 40 and notifies the user 1 that the items "business guide" 5a and "hobby guide" 5b are available. In response to this information, the user 1 who would like to obtain the item "New York" 20a selects the "hobby guide" 5b and gives the instruction to the information-item determination means 2.

The determination means 2 then extracts the "key information" 6 located in the second level of the tree structure stored in the storage means 40 and notifies the user 1 that the items "music guide" 6a and "travel guide" 6b are available. The user 1 selects the item "travel guide" 6b in a manner similar to the above procedure, and then, based on the "key information" 7 located in the third level of the hierarchical structure, the determination means 2 informs the user 1 that the country categories, such as the items "China" 7a, "Japan" 7b, "U.S.A." 7c, "Canada" 7d, etc. are available.

Subsequently, in response to the item "U.S.A." 7c selected by the user 1, the information-item determination means 2 reports to the user 1 that the items "New York", "Los Angeles", etc. are available as the final information 20 belonging to the information "U.S.A." 7c. It can be determined in the terminal 21 that the user 1 would like to finally select the "New York" 20a by informing it to the information-item determination means 2. The determination means 2 then extracts from the information item section 4 one of the ID numbers 9-1 through 9-n corresponding to the final information item "New York" 20a.

Thereafter, the determination means 2 checks, by referring to the information storage system-specifying information 23 (23-1 through 23-n), in which information storage system 22 connected to the network 10 the information "New York" 22a is stored. For extracting the targeted final information "New York" 20a from, for example, the information storage system 22 indicated by the specifying information 23, the determination means 2 then sends the ID number corresponding to the "New York" 20a to the computer controller 14 of the storage system 22 through the network 10.

In the designated information storage system 22, the computer controller 14 receives the ID number and determines, by referring to the look-up table 11, the address in which the targeted information is stored, so that it can extract the information content of the "New York" 20a and sends it to the terminal 21 which has requested this information.

The "key information" 16, 18 and 19 is stored in the information storage system 22 in the form of a hierarchical tree structure in a manner similar to the related information section 3 of the terminal 21, so that the storage system 22 can exert processing in response to requests, not only from the terminal 21 shown in FIG. 1 through the ID numbers, but also accessed from normal terminals (not shown). In this embodiment illustrated in FIG. 1, the key information 16, 18 and 19 stored in the storage system 22 correspond to the key information 5, 6 and 7, respectively, stored in the terminal 21.

In this embodiment constructed and operated as described above, the user 1 is no longer required to use the network 10 in order to gain access to the final information to be retrieved, and the computation of the terminal 21 is merely necessitated until the final information 20 is selected. This can reduce the load to the network 10 and the computation load to the information storage system 22. In the first embodiment, the final information 20 may be stored, not only in a single information storage system 22, but also in other information storage systems 22 connected to the network 10, since the information storage system-specifying information 23-1 through 23-n is stored by a unit of final information 20.

Second Embodiment

In the information storage system of the first embodiment, there presents no problem even though the hierarchical tree structure of the storage unit 15 is changed as long as the final information 20 specified by the ID (9-x) contained in the information item section 4 is included in the storage unit 15 of the information storage system 22 indicated by the storage system-specifying information 23-x corresponding to the ID. Namely, a change in the storage contents of the information storage system 22 does not particularly present any problem if the final information 20 is stored in the same storage system 22. However, a problem may occur if the final information 20 has been moved to another information storage system, because it is unknown to the user 1 to which information storage system the required final information 20 is currently stored.

In order to overcome the above drawback, the below-described second embodiment is constructed by further developing the first embodiment in such a manner that desired information items can be obtained in a fashion similar to the first embodiment without burdening the user 1 even when the final information 20 has been moved from an storage system to another storage system.

(1) Construction

Figure 2:
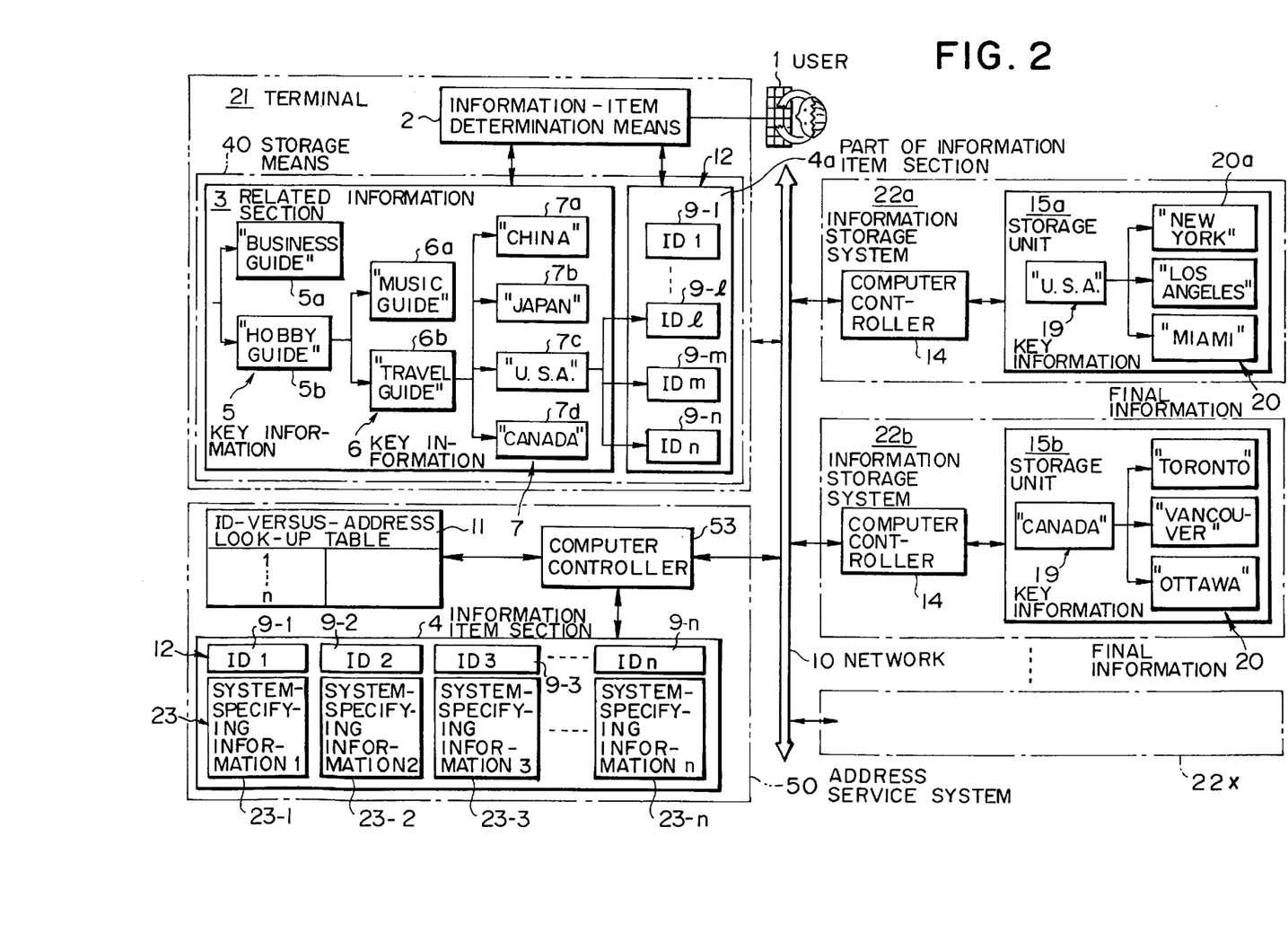
FIG. 2 a schematic diagram illustrating a second preferred embodiment of an information apparatus provided with a terminal of the present invention.

The second embodiment illustrated in FIG. 2 differs from the first embodiment shown in FIG. 1 in that an address service system 50 is connected to the network 10. In this embodiment shown in FIG. 2, the terminal 21, as well as the terminal 21 of the first embodiment, which links the user 1 and the network 10, executes processing on a request made from the user 1 and also transfers the required information to a specific information storage system (22a, . . . , 22x) connected to the network 10.

The terminal 21, constructed in a manner substantially similar to the terminal 21 of the first embodiment, has the information-item determination means 2, the related information section 3 and part 4a of the information item section 4. Although the information-item determination means 2 and the related information section 3 are constructed in a manner substantially similar to those of the first embodiment, ID numbers 9-1 through 9-n are stored in the part 4a of the information item section 4. The related information section 3 and the part 4a of the information item section 4 constitute the storage means 40.

The above-described address service system 50 includes a computer controller 53, an ID-versus-address look-up table 11, and an information item section 4. The information item section 4 and the look-up table 11 are constructed in a manner similar to those of the first embodiment.

The computer controller 53 logically connects the information item section 4 to the network 10. The controller 53 further searches the information item section 4 for the information storage system-specifying information (indicated as system-specifying information 1 through n in FIG. 2) indicating in which of a plurality of information storage systems 22a, 22b, . . . connected to the network 10 the ID number received from the terminal 21 is stored. The controller 53 then determines the retrieved information and sends it to the terminal 21. Additionally, the computer controller 53 retrieves the ID number 12 of the ID-versus-address look-up table 11 and the storage location 13, i.e, the address, of each information storage system, in which the information corresponding to the ID is stored.

An information storage system 22a has a computer controller 14 and a storage unit 15a. Likewise, another information storage system 22b includes a computer controller 14 and a storage unit 15b. A further information storage system 22x similarly has a computer controller and a storage unit.

(2) Operation

An explanation will now be given of the operation of the second embodiment shown in FIG. 2 in the case where the user 1 would like to obtain the travel information "New York" by way of example. For guiding the final information 20 to be retrieved, the information-item determination means 2 of the terminal 21 extracts the "key information" 5 in the first level of the tree structure stored in the related information section 3 of the storage means 40 and informs the user 1 that the items "business guide" 5a and "hobby guide" 5b are available. The user 1 receives this information and instructs the information-item determination means 2 to select the "hobby guide," 5b, since the user 1 would like to obtain the item "New York" 20a as the final information 20.

In response to this instruction, the determination means 2 then extracts the "key information" 6 in the second level of the tree structure stored in the storage means 40 and reports to the user 1 that the items "music guide" 6a and "travel guide" 6b are available. The user 1 selects the item "travel guide" 6b in a manner similar to the above procedure, and then, the determination means 2 notifies, based on the "key information" 7 in the third level of the tree structure, the user 1 that the country categories, such as "China" 7a, "Japan" 7b, "U.S.A." 7c, "Canada" 7d, etc. are available.

The user 1 instructs the information-item determination means 2 to select the "U.S.A." 7c, and in response to this, the determination means 2 answers to the user 1 that the final information 20, such as "New York", "Los Angeles", and the like, belonging to the "U.S.A." 7c, are available. It can be determined in the terminal 21 that the user 21 would like to finally select the "New York" 20a by informing it to the information-item determination means 2. The determination means 2 then extracts the ID number (one of 9-1 through 9-n) associated with the information item "New York" 20a from the part 4a of the information item section 4 and sends the determined ID number to the address service system 50 via the network 10.

The address service system 50 then searches, by using its computer controller 53, the information item section 4 for the information storage system-specifying information 23 representing in which of the information storage systems 22a, 22b, . . . the final information corresponding to the ID number is stored, and designates the storage system in which the final information received from the terminal 21 (i.e., the information 20a "New York" selected by the user 1) is stored. In this embodiment shown in FIG. 2, the information storage system 22a is specified. Subsequently, the address service system 50 sends the information storage system-specifying information to the terminal 21. In response to this information, the information-item determination means 2 of the terminal 21 transmits through the network 10 the ID number to the computer controller 14 of the information storage system 22a indicated by the information storage system-specifying information 23 received from the address service system 50 so as to cause the storage system 22a to extract the targeted final information "New York" 20a.

In the specified information storage system 22a, the computer controller 14 receives the ID number and retrieves the address in which the information is stored, by referring to the ID-versus-address look-up table 11 stored in the address service system 50, so as to extract the final information "New York" 20a requested from the terminal 21 and send it to the terminal 21.

In this embodiment constructed and operated as described above, the user 1 is no longer required to use the network 10 in order to access the final information 20, and the computation of the terminal 21 is merely necessitated until the final information 20 is selected. This can decrease the load to the network 10 and the computation load to the information storage systems 22a, 22b, . . . . Additionally, even though the information contents of a plurality of information storage systems 22a, 22b . . . connected to the network 10 are modified, it is not necessary to make any change in the individual items of the key information, which is the related information provided for the user 1, merely by searching the ID-versus-address look-up table 11 and the information storage system-specifying information 23 of the information storage section 4 within the address service system 50.

The second embodiment is constructed in such a manner that the address service system 50 sends the information storage system-specifying information 23 corresponding to the ID number received from the terminal 21, and then, the information storage systems 22a, 22b, . . . retrieve the storage location (address) of the final information by referring to the ID-versus-address look-up table 11 of the address service system 50. However, upon receiving the ID number from the terminal 21, the address service system 50 may search not only the information item section 4 but also the ID-versus-address look-up table 11, and then, sends the terminal 21 the retrieved storage location (address) in which the final information corresponding to the ID number is stored, together with the information storage system-specifying information 23. In this case, the terminal 21 transmits the final information address instead of the ID number to the storage systems 22a, 22b, . . . . This eliminates the necessity for the storage systems 22a, 22b, . . . to make an query of the final information address to the address service system 50.

Although in this embodiment the ID-versus-address look-up table 11 is stored in the address service system 50, the look-up table corresponding to the final information 20 may be stored in each of the information storage systems 22a, 22b, . . . , as illustrated in FIG. 1.

Third Embodiment

Figure 3:
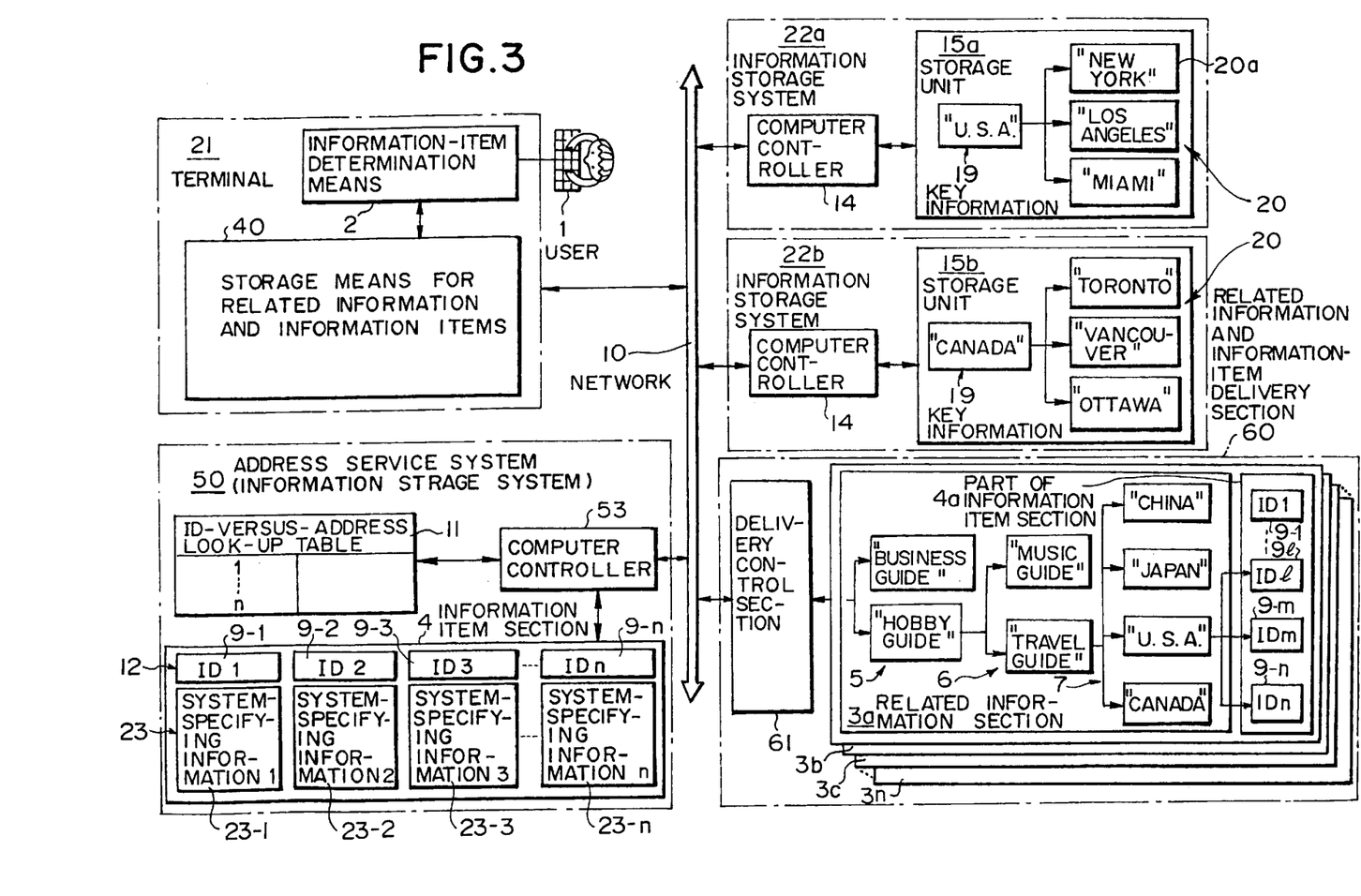
FIG. 3 a schematic diagram illustrating a third preferred embodiment of an information apparatus provided with a terminal of the present invention.

A third embodiment shown in FIG. 3 is achieved by further developing the second embodiment illustrated in FIG. 2. More specifically, the contents of the storage means 40 for the related information and the information items within the user's terminal 21 can be loaded as required from a related-information and information-item delivery section 60 through the network 10, thereby modifying the contents of the storage means 40 of the terminal 21.

In order to satisfy the aforementioned feature, in the third embodiment shown in FIG. 3, the related-information and information-item delivery section 60 is further added to the components of the second embodiment. From this delivery section 60, the "key information" 5, 6 and 7, which is the related information stored in the storage means 40 of the terminal 21, and the ID numbers 9-1 through 9-n indicating the information items are delivered to the storage means 40 through the network 10 by means of communications. The delivery section 60 has a plurality of related information portions (related information sections) 3a, 3b, 3c, ... which have different information contents. A delivery control section 61 selects one of the related information portions 3a, 3b, 3c, . . . and delivers or moves it to the storage means 40 of the terminal 21, so that the related information and information items stored in the storage means 40 can be rewritten from the delivery section 60. In this manner, the related information portion 3a, for example, having the related information and information item corresponding to a request made from the user 1, can be transferred to the storage means 40 of the terminal 21, and the contents of the storage means 40 are thus rewritable.

Although in the foregoing embodiments the related information and the information items concerning travelling have been explained by way of example, the present invention is not restricted thereto and applicable to the other fields, for example, service information about products.

As will be clearly understood from the foregoing description, the present invention offers the following advantages. The network can be used less frequently so as to reduce the load to the network, and also, the user is able to easily obtain targeted information items.

What is claimed is:

1. A terminal for communicating data over a network with an information storage system, said terminal comprising:

storage means for storing information, said information including a plurality of information items and mutually-related information concerning said plurality of information items, wherein said plurality of information items and said mutually-related information are pre-recorded on said storage means;

information-item indication means for indicating one of said plurality of information items in response to a user selecting one of said mutually-related information;

means for sending the indicated one information item over a network from said terminal; and means for receiving over said network at said terminal from an information storage system final information corresponding to the indicated one information item.

2. The terminal of claim 1, wherein said mutually-related information comprises a tree-structured data hierarchy having more than one level.

3. The terminal of claim 2, wherein more than one level of said tree-structured data hierarchy must be selected before the indicated one information item is indicated.

4. A terminal according to claim 1, wherein said storage means further stores information storage system-specifying information indicating in which of a plurality of information storage systems connected to said network said final information corresponding to the indicated one information item is stored.

5. A terminal according to claim 1, wherein said information-item indication means obtains from an address determination system via said network information storage system-specifying information indicating in which of a plurality of information storage systems connected to said network said final information corresponding to the indicated one information item is stored.

6. A method of communicating data over a network between a terminal and an information storage system, comprising the steps of:

provinding a storage means for storing information, said information including a plurality of information items and mutually-related information concerning said plurality of information items, wherein said plurality of information items and said mutually-related information are pre-recorded on said storage means;

indicating one of said plurality of information items in response to a user selecting one of said mutually-related information; sending the indicated one information item over a network from a terminal; and receiving over said network at said terminal from an information storage system final information corresponding to the indicated one information item.

7. The method of claim 6, wherein said storage means further stores information storage system-specifying information indicating in which of a plurality of information storage systems connected to said network said final information corresponding to the indicated one information item is stored.

8. The method of claim 6, wherein said step of indicating comprises:

obtaining from an address determination system via said network information storage system-specifying information indicating in which of a plurality of information storage systems connected to said network said final information corresponding to the indicated one information item is stored.

9. The method of claim 6, wherein said mutually-related information comprises a tree-like data structure having more than one level.

10. The method of claim 9, wherein more than one level of said tree-like data structure must be selected before the indicated one information item is indicated.

11. An information storage medium readable in a terminal located on a network for communicating data with at least one information storage system, said information storage medium comprising:

a plurality of information items, wherein each information item is indicative of one of a plurality of final information stored on at least one information storage system; and mutually-related information concerning said plurality of information items, wherein said plurality of information items and said mutually-related information items are pre-recorded on said information storage medium.

12. The information storage medium of claim 11, wherein said mutually-related information comprises a tree-structured data hierarchy having more than one level.

13. The information storage medium of claim 11, further comprising:

information-item determining control information for causing said terminal to determine, based on said related information, one of said plurality of information items demanded by the user for said terminal; and information-item extracting control information for extracting the information item determined by said information-item determining control information from said information storage system via said communication line.

* * * * *